United States Patent
Nakayama

(10) Patent No.: US 10,894,520 B2
(45) Date of Patent: Jan. 19, 2021

(54) CONTROL DEVICE

(71) Applicant: TOYOTA JIDOSHA KABUSHIKI KAISHA, Toyota (JP)

(72) Inventor: Shigeki Nakayama, Gotemba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 94 days.

(21) Appl. No.: 16/256,259

(22) Filed: Jan. 24, 2019

(65) Prior Publication Data

US 2019/0232901 A1  Aug. 1, 2019

(30) Foreign Application Priority Data

Jan. 31, 2018  (JP) .................. 2018-015446

(51) Int. Cl.
| | |
|---|---|
| *B60R 16/033* | (2006.01) |
| *F01N 3/20* | (2006.01) |
| *H02J 7/14* | (2006.01) |
| *F01N 9/00* | (2006.01) |
| *B60R 16/03* | (2006.01) |

(52) U.S. Cl.
CPC ............ *B60R 16/033* (2013.01); *B60R 16/03* (2013.01); *F01N 3/2013* (2013.01); *F01N 9/00* (2013.01); *H02J 7/1438* (2013.01); *F01N 2590/11* (2013.01); *F01N 2900/104* (2013.01);
(Continued)

(58) Field of Classification Search
CPC ......... B60R 16/033; B60R 16/03; F01N 9/00; F01N 3/2013; F01N 2590/11; F01N 2900/1602; F01N 2900/104; F01N 2900/1626; H02J 7/1438; F02D 45/00
See application file for complete search history.

(56) References Cited

U.S. PATENT DOCUMENTS

| | | | |
|---|---|---|---|
| 5,492,190 A * | 2/1996 | Yoshida .................. | B60K 6/28 180/65.245 |
| 2012/0204540 A1* | 8/2012 | Gonze .................. | F01N 3/2013 60/274 |

FOREIGN PATENT DOCUMENTS

| | | |
|---|---|---|
| JP | 2006-233852 | 9/2006 |
| JP | 2017-166463 | 9/2017 |

* cited by examiner

*Primary Examiner* — Rexford N Barnie
*Assistant Examiner* — Terrence R Willoughby
(74) *Attorney, Agent, or Firm* — Oblon, McClelland, Maier & Neustadt, L.L.P.

(57) ABSTRACT

A control device for a vehicle comprised of an electric power supply control part controlling the supply of electric power to electrical equipment and an electric power transfer control part controlling the transfer of electric power between a first battery and a second battery. The electric power supply control part supplies the electric power of the second battery to a catalyst device if the electric power which can be output by the first battery is smaller than the total demanded output electric power of the electrical equipment and a need arises to supply electric power to the catalyst device so as to warm up the catalyst device. The electric power transfer control part supplies electric power of the first battery to the second battery if the electric power which can be output by the first battery is larger than the total demanded output electric power of the electrical equipment, the state of charge of the second battery is less than a predetermined first state of charge considered required when using the electric power of the second battery to warm up the catalyst device, and a temperature of the catalyst device is less than a predetermined temperature.

3 Claims, 3 Drawing Sheets

(52) U.S. Cl.
CPC ................ *F01N 2900/1602* (2013.01); *F01N 2900/1626* (2013.01)

CONTROL DEVICE

CROSS-REFERENCE TO RELATED APPLICATION

This application claims priority based on Japanese Patent Application No. 2018-015446 filed with the Japan Patent Office on Jan. 31, 2018, the entire contents of which are incorporated into the present specification by reference.

FIELD

The present disclosure relates to a control device for a vehicle.

BACKGROUND

Japanese Unexamined Patent Publication No. 2017-166463 discloses a hybrid vehicle provided with a battery and a capacitor for making up for insufficient output of the battery. Further, as the control device of such a hybrid vehicle, one configured to control a state of charge of the capacitor at the time of stopping the engine to a target state of charge in accordance with the outside air temperature is disclosed.

SUMMARY

In the case of a vehicle provided with an electric heating type catalyst device (EHC; electrical heated catalyst) in an exhaust passage of an internal combustion engine, to reduce the exhaust emission, it is effective to supply electric power to the catalyst device in advance to heat the catalyst device before starting up the internal combustion engine and to start up the internal combustion engine after the catalyst device finishes warming up.

In the above-mentioned conventional hybrid vehicle, when the output of the battery becomes insufficient while running in the EV mode, that shortage must be made up for by the capacitor. For this reason, when a need arises to use the electric power of the sub battery to warm up the catalyst device, the state of charge of the sub battery is liable to become insufficient relative to the amount of electric power required for warm-up of the catalyst device.

The present disclosure was made focusing on such a problem and has as its object to keep the state of charge of the sub battery from becoming insufficient relative to the amount of electric power required for warming up a catalyst device when a need arises to use electric power of the sub battery for warming up the catalyst device.

To solve the above problem, according to one aspect of the present disclosure, there is provided a control device for controlling a vehicle. The vehicle comprises an internal combustion engine, a rotary electrical machine, an electric heating type catalyst device provided in an exhaust passage of the internal combustion engine, a first battery for supplying electric power to electrical equipment including at least the rotary electrical machine and the catalyst device, and a second battery for supplying insufficient electric power to the electrical equipment if electric power which can be output by the first battery is smaller than a total demanded output electric power of the electrical equipment. The control device comprises an electric power supply control part configured so as to control a supply of electric power to the electrical equipment, and an electric power transfer control part configured so as to control transfer of electric power between the first battery and the second battery. The electric power supply control part is configured so as to supply the electric power of the second battery to the catalyst device if the electric power which can be output by the first battery is smaller than the total demanded output electric power of the electrical equipment and a need arises for supplying electric power to the catalyst device so as to warm up the catalyst device. The electric power transfer control part is configured to supply the electric power of the first battery to the second battery if the electric power which can be output by the first battery is larger than the total demanded output electric power of the electrical equipment, the state of charge of the second battery is less than a predetermined first state of charge which is required when using the electric power of the second battery to warm up the catalyst device, and the temperature of the catalyst device is less than a predetermined temperature.

According to this aspect of the present disclosure, when a need arises for using the electric power of the sub battery for warming up the catalyst device, it is possible to keep the state of charge of the sub battery from becoming insufficient relative to the amount of electric power required for warming up the catalyst device.

DESCRIPTION OF EMBODIMENTS

Figure 1:
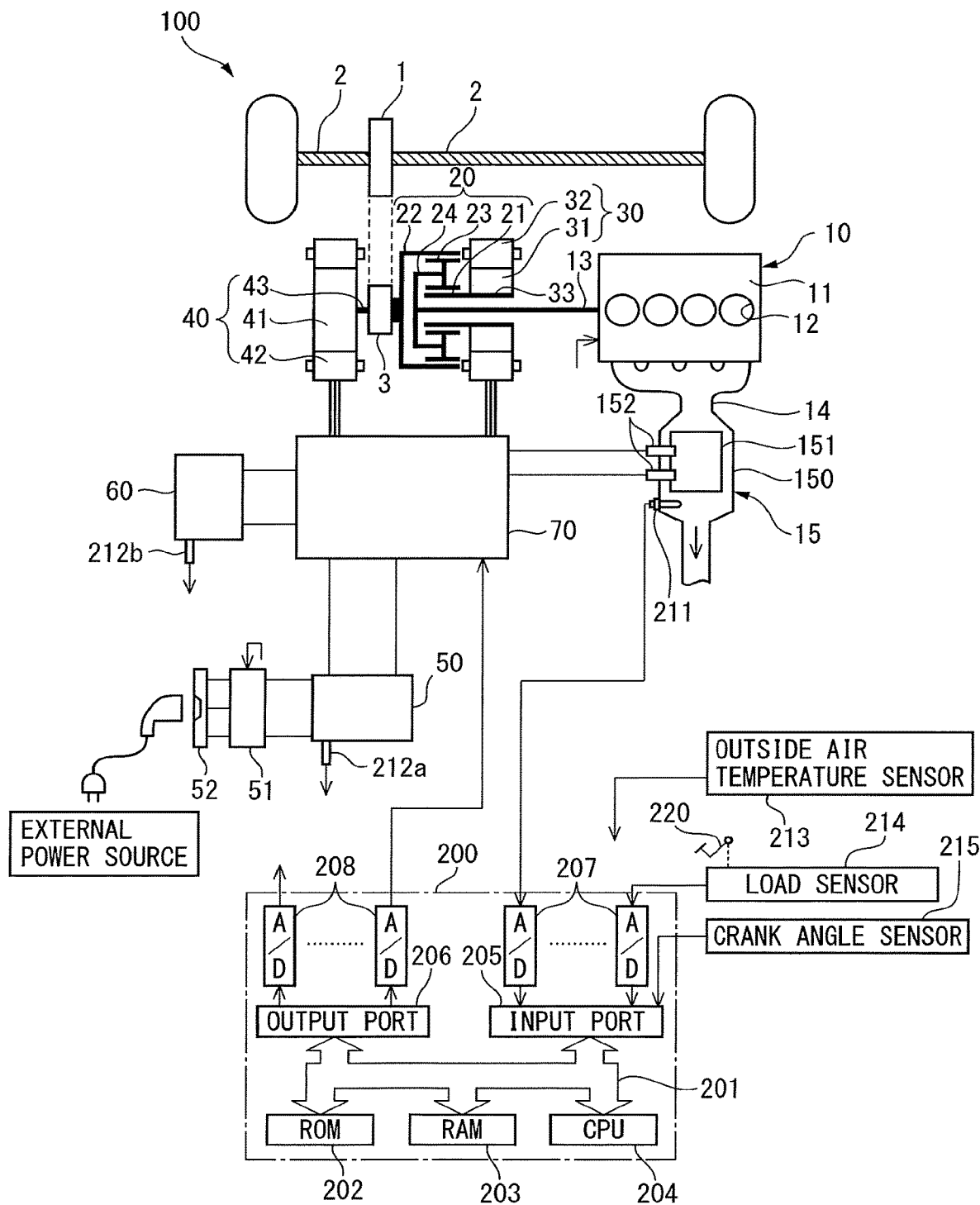
FIG. 1 is a schematic view of the configuration of a vehicle and an electronic control unit controlling the vehicle according to one embodiment of the present disclosure.

Below, referring to the drawings, an embodiment of the present disclosure will be explained in detail. Note that, in the following explanation, similar component elements are assigned the same reference signs.

FIG. 1 is a schematic view of the configuration of a vehicle 100 and an electronic control unit 200 controlling the vehicle 100 according to one embodiment of the present disclosure.

The vehicle 100 is provided with an internal combustion engine 10, drive power distributing mechanism 20, first rotary electrical machine 30, second rotary electrical machine 40, main battery 50, sub battery 60, and electric power control circuit 70 and is configured so as to enable the drive power of one or both of the internal combustion engine 10 and the second rotary electrical machine 40 to be transmitted to a wheel drive shaft 2 through a final deceleration device 1.

The internal combustion engine 10 makes fuel burn inside cylinders 12 formed in an engine body 11 to generate drive power for making an output shaft 13 connected to a crankshaft rotate. The internal combustion engine 10 according to the present embodiment is a gasoline engine, but it may also be made a diesel engine. The exhaust discharged from the cylinders 12 to an exhaust passage 14 flows through the exhaust passage 14 and is discharged into the atmosphere. The exhaust passage 14 is provided with an electric heating type catalyst device (EHC; electrical heated catalyst) 15 for removing harmful substances in the exhaust.

The electric heating type catalyst device 15 comprises a housing 150, a honeycomb type conductor support 151 supporting a catalyst on its surface, and a pair of electrodes 152 for applying voltage to the conductor support 151.

The conductor support 151 is, for example, a support formed by silicon carbide (SiC), molybdenum disilicide (MoSi$_2$), or another material generating heat when carrying current. The conductor support 151 is provided inside the housing 150 in a state electrically insulated from the housing 150. In the present embodiment, the surface of the conductor support 151 is made to support a three-way catalyst, but the type of the catalyst made to be supported on the surface of the conductor support 151 is not particularly limited. It is possible to suitably select the catalyst necessary for obtaining the desired exhaust purification performance from various catalysts and make the conductor support 151 support it.

Downstream of the conductor support 151, a catalyst temperature sensor 211 for detecting a temperature of the conductor support 151 (below, referred to as "the catalyst bed temperature") is provided.

The pair of electrodes 152 are respectively electrically connected to the conductor support 151 in a state electrically insulated from the housing 150 and are connected through the electric power control circuit 70 to the main battery 50 and the sub battery 60. By applying voltage through the pair of electrodes 152 to the conductor support 151 to supply electric power to the conductor support 151, current flows to the conductor support 151 whereby the conductor support 151 is heated and the catalyst supported on the surface of the conductor support 151 is heated. The voltage applied to the conductor support 151 by the pair of electrodes 152 is adjusted by the electronic control unit 200 controlling the electric power control circuit 70.

The drive power distributing mechanism 20 is a planetary gear mechanism for dividing the drive power of the internal combustion engine 10 into two systems of drive power for making the wheel drive shaft 2 rotate and drive power for driving the regenerative operation of the first rotary electrical machine 30 and comprises a sun gear 21, ring gear 22, pinion gears 23, and a planetary carrier 24.

The sun gear 21 is an external gear and is arranged at the center of the drive power distributing mechanism 20. The sun gear 21 is coupled with the rotary shaft 33 of the first rotary electrical machine 30.

The ring gear 22 is an internal gear and is arranged around the sun gear 21 so as to be concentric with the sun gear 21. The ring gear 22 is coupled with the rotary shaft 33 of the second rotary electrical machine 40. Further, the ring gear 22 has attached to it an integrally formed drive gear 3 for transmitting rotation of the ring gear 22 to the wheel drive shaft 2 through the final deceleration device 1.

The pinion gear 23 is an external gear. A plurality are arranged between the sun gear 21 and ring gear 22 so as to mesh with the sun gear 21 and ring gear 22.

The planetary carrier 24 is coupled with the output shaft 13 of the internal combustion engine 10 and rotates about the output shaft 13. Further, the planetary carrier 24 is also coupled with the pinion gears 23 so that when the planetary carrier 24 rotates, the pinion gears 23 can individually turn (rotate) while turning (revolving) around the sun gear 21.

The first rotary electrical machine 30 is, for example, a three-phase AC synchronous type motor generator which is provided with a rotor 31 which is attached to the outer circumference of a rotary shaft 33 coupled with the sun gear 21 and which has a plurality of permanent magnets embedded in its peripheral part and a stator 32 around which is wound an excitation coil generating a rotating magnetic field. The first rotary electrical machine 30 has the function as a motor receiving a supply of electric power from the main battery 50 or the sub battery 60 and driving a powering operation and the function as a generator receiving drive power of the internal combustion engine 10 and driving a regenerative operation.

In the present embodiment, the first rotary electrical machine 30 is mainly used as a generator. Further, it is used as a motor when making the output shaft 13 rotate for cranking at the time of startup of the internal combustion engine 10 and performs the role as a starter.

The second rotary electrical machine 40 is, for example, a three-phase AC synchronous type motor generator which is provided with a rotor 41 which is attached to the outer circumference of a rotary shaft 43 coupled with the ring gear 22 and which has a plurality of permanent magnets embedded in its peripheral part and a stator 42 around which is wound an excitation coil generating a rotating magnetic field. The second rotary electrical machine 40 has the function as a motor receiving a supply of electric power from the main battery 50 or the sub battery 60 and driving a powering operation and the function as a generator receiving drive power from the wheel drive shaft 2 and driving a regenerative operation at the time of deceleration of the vehicle etc.

The main battery 50 is, for example, a nickel-cadmium storage battery or nickel-hydrogen storage battery, lithium ion battery, or other chargeable/dischargeable chemical battery.

The main battery 50 is electrically connected through the electric power control circuit 70 to the first rotary electrical machine 30 and the second rotary electrical machine 40 so as to enable the electric power of the main battery 50 to be supplied to the first rotary electrical machine 30 and the second rotary electrical machine 40 to drive the powering operation of these and, further, to enable the generated electric power of the first rotary electrical machine 30 and the second rotary electrical machine 40 to be charged. Further, the main battery 50 is also electrically connected through the electric power control circuit 70 to a conductor support 151 so as to enable the electric power of the main battery 50 to be supplied to the conductor support 151 to heat the conductor support 151. Further, the main battery 50 is also electrically connected to not shown various types of electrical equipment operated while the vehicle 100 is being driven in accordance with need.

Further, the main battery 50 is, for example, configured to be able to be electrically connected to a household power outlet or other outside power source through a charging control circuit 51 and a charging lid 52 so that it can be charged from that outside power source. The charging control circuit 51 is an electrical circuit able to convert the AC current supplied from an outside power source to DC current and boost the input voltage to charge the electric power of the outside power source at the main battery 50 based on control signals of the electronic control unit 200.

The sub battery 60 is, for example, a capacitor or other battery which can be charged and discharged without accompanying chemical change and a battery with a higher output density [W/kg] (amount of electric power able to be charged/discharged per unit weight·unit time) than the main battery 50. The sub battery 60 is electrically connected through the electric power control circuit 70 to the first rotary electrical machine 30 and the second rotary electrical machine 40 so as to enable the electric power of the sub battery 60 to be supplied to the first rotary electrical machine 30 and the second rotary electrical machine 40 to drive powering operations of these and, further, to enable the generated electric power of the first rotary electrical machine 30 and the second rotary electrical machine 40 to be charged. Further, the sub battery 60 is also electrically connected through the electric power control circuit 70 to the conductor support 151 so as to enable the electric power of the sub battery 60 to be supplied to the conductor support 151 to heat conductor support 151. Further the sub battery 60, in the same way as the main battery 50, is also electrically connected to not shown various types of electrical equipment in accordance with need.

The electric power control circuit 70 is an electrical circuit configured to enable the electric power of the main battery 50 and the sub battery 60 to be selectively supplied to the first rotary electrical machine 30 or the second rotary electrical machine 40, conductor support 151, etc. based on a control signal from the electronic control unit 200 and further to enable the generated electric power of the first rotary electrical machine 30 and the second rotary electrical machine 40 to be selectively charged to the main battery 50 and the sub battery 60.

The electronic control unit 200 is comprised of a digital computer provided with components connected with each other by a bidirectional bus 201 such as a ROM (read only memory) 202, RAM (random access memory) 203, CPU (microprocessor) 204, input port 205, and output port 206.

The input port 205 receives as input through corresponding AD converters 207 output signals of the above-mentioned catalyst temperature sensor 211, a first SOC sensor 212a for detecting the state of charge SOCM of the main battery 50, a second SOC sensor 212b for detecting the state of charge SOCS of the sub battery 60, an outside air temperature sensor 213 for detecting the outside air temperature, etc. Further, the input port 205 receives as input through a corresponding AD converter 207 an output voltage of a load sensor 214 generating an output voltage proportional to the amount of depression of the accelerator pedal 220 (below, referred to as "the amount of accelerator depression"). Further, the input port 205 receives as input an output signal of a crank angle sensor 215 generating an output pulse every time a crankshaft of the engine body 11 rotates by for example 15° as a signal for calculating an engine speed N. In this way, the input port 205 receives as input the output signals of various sensors required for controlling the vehicle 100.

To the output port 206, spark plugs (not shown) of the engine body 11, the electric power control circuit 70, and other control parts are electrically connected through the corresponding drive circuits 208.

The electronic control unit 200 outputs control signals for controlling the control parts from the output port 206 to control the vehicle 100 based on the output signals of the various sensors input to the input port 205.

Below, the control of the vehicle 100 according to the present embodiment performed by the electronic control unit 200 will be explained.

The electronic control unit 200 sets a driving mode of the vehicle 100 to either an EV (electric vehicle) mode or an HV (hybrid vehicle) mode and performs driving control corresponding to the individual driving modes.

When setting the driving mode of the vehicle 100 to the EV mode, the electronic control unit 200 basically makes the internal combustion engine 10 stop and in that state uses the electric power of the main battery 50 to drive the powering operation of the second rotary electrical machine 40 and use only the drive power of the second rotary electrical machine 40 to make the wheel drive shaft 2 rotate.

At this time, from the viewpoint of suppression of degradation of the main battery 50, an upper limit value is set for the output electric power of the main battery 50. For this reason, for example, when the amount of accelerator depression increases at the time rapid acceleration is demanded and the demanded output electric power PT [kW] of the vehicle 100 becomes a predetermined electric power or more etc., sometimes the upper limit value of the output electric power PM [kW] of the main battery 50 (below, referred to as "the electric power which can be output") becomes smaller than the demanded output electric power PT of the vehicle 100 and the electric power becomes insufficient with just the output electric power of the main battery 50. Note that, "the demanded output electric power PT of the vehicle 100 in the present embodiment" is the total amount of the electric power required for operating electrical equipment whose operation is demanded while the vehicle 100 is being driven among the various types of electrical equipment including at least the second rotary electrical machine 40 and the catalyst device 15. Therefore, in other words, the demanded output electric power PT of the vehicle 100 can be said to be the total demanded output electric power of the various types of electrical equipment to which the electric power of the main battery 50 is supplied.

Therefore, the electronic control unit 200 basically tries to make up for the insufficient electric power by the electric power of the sub battery 60 if the electric power PM which can be output from the main battery 50 becomes smaller than the demanded output electric power PT of the vehicle 100. That is, if the electric power becomes insufficient with just the output electric power of the main battery 50, the electronic control unit 200 uses the electric power of the main battery 50 and the sub battery 60 to drive the powering operation of second rotary electrical machine 40 and make the wheel drive shaft 2 rotate by just the drive power of the second rotary electrical machine 40.

Further, if the state where the electric power PM which can be output from the main battery 50 becomes smaller than the demanded output electric power PT of the vehicle 100 continues for a long period of time and the state of charge SOCS of the sub battery 60 becomes less than a predetermined low state of charge SBL (for example, 0 to several % or so of the full state of charge), the electronic control unit 200 can no longer make up for the shortage of electric power by the electric power of the sub battery 60. Therefore, the electronic control unit 200 as an exception starts up the internal combustion engine 10 and transfers the drive power of the internal combustion engine 10 to the wheel drive shaft 2 and uses the electric power of the main battery 50 to drive the powering operation of the second rotary electrical machine 40 and use the drive power of both of the internal combustion engine 10 and the second rotary electrical machine 40 to make the wheel drive shaft 2 rotate.

In this way, the EV mode is a mode where the electric power of the main battery 50 and the sub battery 60 is preferentially utilized to drive the powering operation of the second rotary electrical machine 40 and at least the drive power of the second rotary electrical machine 40 is transmitted to the wheel drive shaft 2 to make the vehicle 100 run.

On the other hand, when setting the driving mode of the vehicle 100 to the HV mode, the electronic control unit 200 divides the drive power of the internal combustion engine 10 into two systems by the drive power distributing mechanism 20, transmits one divided drive power of the internal combustion engine 10 to the wheel drive shaft 2, and uses the other drive power to drive a regenerative operation of the first rotary electrical machine 30. Further, basically, it uses the generated electric power of the first rotary electrical machine 30 to drive a powering operation of the second rotary electrical machine 40 and transmits one drive power of the internal combustion engine 10 plus the drive power of the second rotary electrical machine 40 to the wheel drive shaft 2. As an exception, for example, if a demand for rapid acceleration arises etc., to secure the driving performance of the vehicle 100, it uses the generated electric power of the first rotary electrical machine 30 and the electric power of the main battery 50 to drive the powering operation of the second rotary electrical machine 40 and transmits the drive power of both of the internal combustion engine 10 and the second rotary electrical machine 40 to the wheel drive shaft 2.

In this way, the HV mode is a mode where the internal combustion engine 10 is operated and the generated electric power of the first rotary electrical machine 30 is preferentially utilized to drive a powering operation of the second rotary electrical machine 40 and the drive power of both of the internal combustion engine 10 and the second rotary electrical machine 40 is transmitted to the wheel drive shaft 2 to make the vehicle 100 run.

Here, the harmful substances in the exhaust discharged from the cylinders 12 of the internal combustion engine 10 to the exhaust passage 14 are removed by the catalyst device 15 provided in the exhaust passage 14 and discharged into the atmosphere. In order for the catalyst device 15 to exhibit the desired exhaust purification performance, the catalyst supported at the conductor support 151 has to be raised in temperature to the activation temperature to make the catalyst active. For this reason, to keep the exhaust emission after engine startup from deteriorating, preferably current starts to be supplied to the conductor support 151 before engine startup to start warm-up of the catalyst device 15 and the internal combustion engine 10 is started up after the catalyst device 15 finishes being warmed up (after the catalyst is activated).

However, as explained above, if, during the EV mode, for example, a demand for rapid acceleration arises etc., sometimes the electric power PM which can be output from the main battery 50 becomes smaller than the demanded output electric power PT of the vehicle 100 and a state arises where it is necessary to use the electric power of the sub battery 60 in addition to the electric power of the main battery 50 (below, referred to as "the sub electric power demanded state"). Further, when the sub electric power demanded state continues for a long period of time and the state of charge SOCS of the sub battery 60 becomes less than the low state of charge SBL, the internal combustion engine 10 has to be started up. During the EV mode, whether the sub electric power demanded state is entered and further how long the sub electric power demanded state continues depends on the operation of the driver at each instant, so prediction of the same is difficult.

Therefore, to keep the internal combustion engine 10 from starting up during the EV mode, it is effective to maintain the state of charge SOCS of the sub battery 60 at a high value.

For this reason, in the present embodiment, when the state of charge SOCS of the sub battery 60 is less than a predetermined maintained target state of charge SBT (in the present embodiment, state of charge corresponding to the full state of charge of the sub battery 60), the generated electric power of the second rotary electrical machine 40 at the time of deceleration (below, referred to as "the regenerated power") is made to be preferentially charged at the sub battery 60.

Further, when the sub electric power demanded state is entered, when the state of charge SOCS of the sub battery 60 becomes less than a predetermined state of charge SB1 for preparation for startup larger than the low state of charge SBL and smaller than the maintained target state of charge SBT, if the catalyst bed temperature TEHC is less than the predetermined activation temperature T1, the electric power of the sub battery 60 is used to make up for the insufficient output electric power of the main battery 50 while the electric power of the sub battery 60 is supplied to the catalyst device 15 to start the warm-up of the catalyst device 15 and prepare for startup of the internal combustion engine 10.

The state of charge SB1 for preparation for startup is the state of charge required when using the electric power of the sub battery 60 to warm up the catalyst device 15. It is set to a state of charge enabling the catalyst device 15 to finish being warmed up before the state of charge SOCS of the sub battery 60 becomes the low state of charge SBL even if supplying the electric power of the sub battery 60 to the catalyst device 15 in addition to the second rotary electrical machine 40 when becoming the sub electric power demanded state.

Due to this, even after the state of charge SOCS of the sub battery 60 becomes less than the state of charge SB1 for preparation for startup, the sub electric power demanded state continues. Even after the state of charge SOCS of the sub battery 60 becomes less than the low state of charge SBL and the internal combustion engine 10 has to be started up, the exhaust emission can be kept from deteriorating.

On the other hand, even when the sub electric power demanded state is entered, sometimes the sub electric power demanded state is eliminated in the period from when the state of charge SOCS of the sub battery 60 becomes the state of charge SB1 for preparation for startup to when it falls to the low state of charge SBL. In this case, the electric power PM which can be output from the main battery 50 becomes larger than the demanded output electric power PT of the vehicle 100, so there is no longer a need to use the electric power of the sub battery 60 and, further, the internal combustion engine 10 no longer has to be started up.

However, if the state of charge SOCS of the sub battery 60 is left at a state of charge SBM from the low state of charge SBL to the state of charge SB1 for preparation for startup (below, referred to as the "medium state of charge"), the following problem arises.

That is, when the state of charge SOCS of the sub battery 60 becomes the medium state of charge SBM, if the sub electric power demanded state again ends up being entered, the state of charge SOCS of the sub battery 60 is liable to end up becoming less than the low state of charge SBL before the catalyst device 15 finishes warming up. This being so, to secure driving performance, it becomes necessary to start up the internal combustion engine 10 before the catalyst device 15 finishes warming up. As a result, the harmful substances in the exhaust can no longer be sufficiently removed by the catalyst device 15, so the exhaust emission deteriorates. Further, to keep the exhaust emission from deteriorating, it is necessary to wait until the catalyst device 15 finishes warming up and therefore it is no longer possible to secure driving performance.

Therefore, when the state of charge SOCS of the sub battery 60 becomes the medium state of charge SBM, it is desirable to make the state of charge SOCS of the sub battery 60 increase quickly to at least the state of charge SB1 for preparation for startup.

At this time, in the present embodiment, the regenerated power is made to be preferentially charged at the sub battery 60, but it is also fully conceivable that the sub electric power demanded state will end up again being entered before the sub battery 60 is charged by the regenerated power.

Therefore, in the present embodiment, if the electric power PM which can be output from the main battery 50 becomes larger than the demanded output electric power PT of the vehicle 100, the state of charge SOCS of the sub battery 60 becomes less than the state of charge SB1 for preparation for startup, and the catalyst bed temperature TEHC is less than the predetermined activation temperature T1, the electric power of the main battery 50 is supplied to the sub battery 60 to charge the sub battery 60.

Due to this, when the state of charge SOCS of the sub battery 60 becomes the medium state of charge SBM, rather than relying on just the regenerated power, it is possible to make the state of charge SOCS of the sub battery 60 increase to the state of charge SB1 for preparation for startup.

Below, referring to FIG. 2, control for supply of the regenerated power of the second rotary electrical machine 40 will be explained, then referring to FIG. 3, control for transfer of electric power between the main battery 50 and the sub battery 60 according to the present embodiment will be explained.

Figure 2:
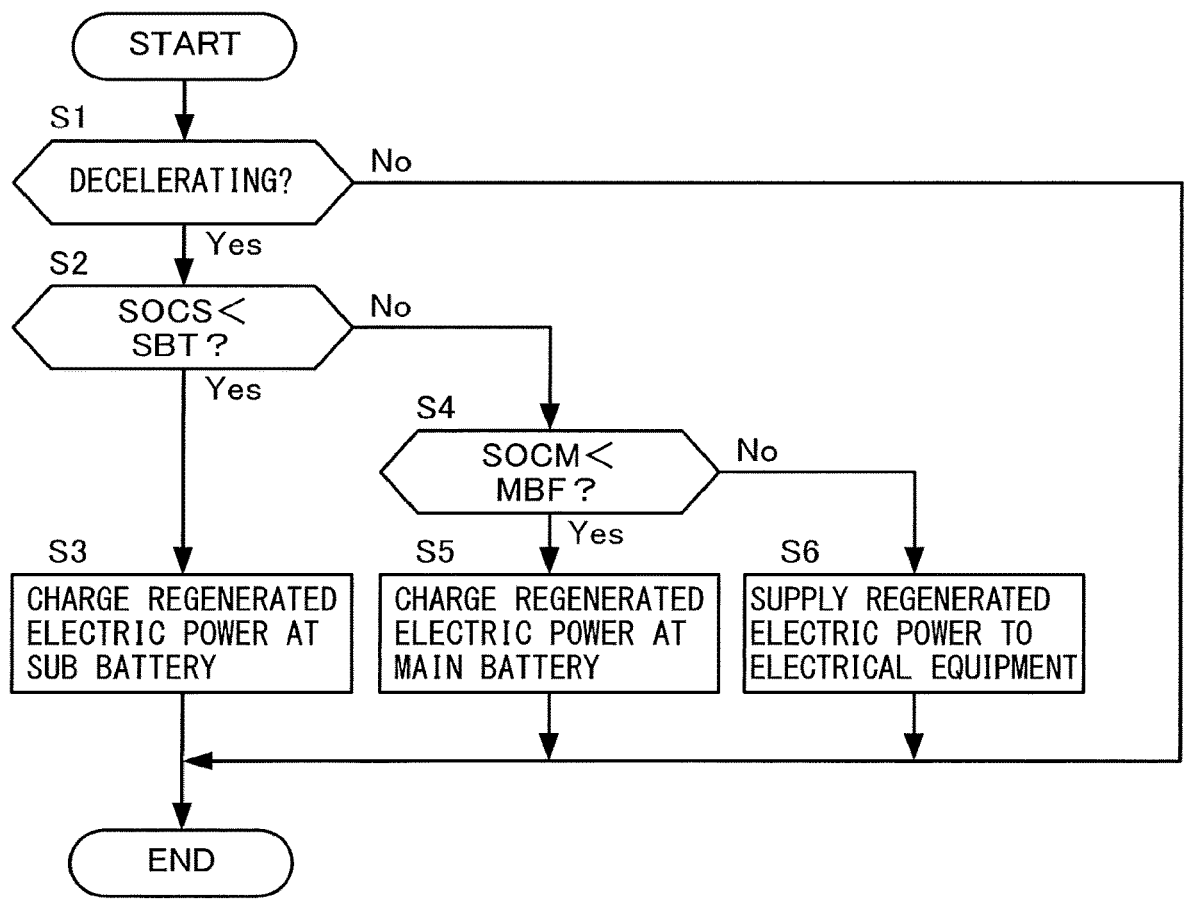
FIG. 2 is a flow chart for explaining control for supply of regenerated power of the second rotary electrical machine according to one embodiment of the present disclosure.

FIG. 2 is a flow chart for explaining control for supplying regenerated power of the second rotary electrical machine 40 according to the present embodiment. The electronic control unit 200 repeatedly performs the present routine by a predetermined processing period.

At step S1, the electronic control unit 200 judges if the vehicle is decelerating. In the present embodiment, the electronic control unit 200 judges if the amount of accelerator depression is zero. The electronic control unit 200 proceeds to the processing of step S2 if the vehicle is decelerating and ends the current processing if it is not decelerating.

At step S2, the electronic control unit 200 judges if the state of charge SOCS of the sub battery 60 is less than the maintained target state of charge SBT. The electronic control unit 200 proceeds to the processing of step S3 if the state of charge SOCS of the sub battery 60 is less than the maintained target state of charge SBT. On the other hand, the electronic control unit 200 proceeds to the processing of step S4 if the state of charge SOCS of the sub battery 60 is the first state of charge SB1 or more.

At step S3, the electronic control unit 200 charges the regenerated power of the second rotary electrical machine 40 at the sub battery 60.

At step S4, the electronic control unit 200 judges if the state of charge SOCM of the main battery 50 is less than the full state of charge MBF of the main battery 50. The electronic control unit 200 proceeds to the processing of step S5 if the state of charge SOCM of the main battery 50 is less than the full state of charge MBF. On the other hand, the electronic control unit 200 proceeds to the processing of step S6 if the state of charge SOCM of the main battery 50 is the full state of charge MBF.

At step S5, the electronic control unit 200 charges the regenerated power of the second rotary electrical machine 40 at the main battery 50.

At step S6, the electronic control unit 200 supplies the regenerated power of the second rotary electrical machine 40 to the catalyst device 15 or other electrical equipment other than the second rotary electrical machine 40 in accordance with need.

Figure 3:
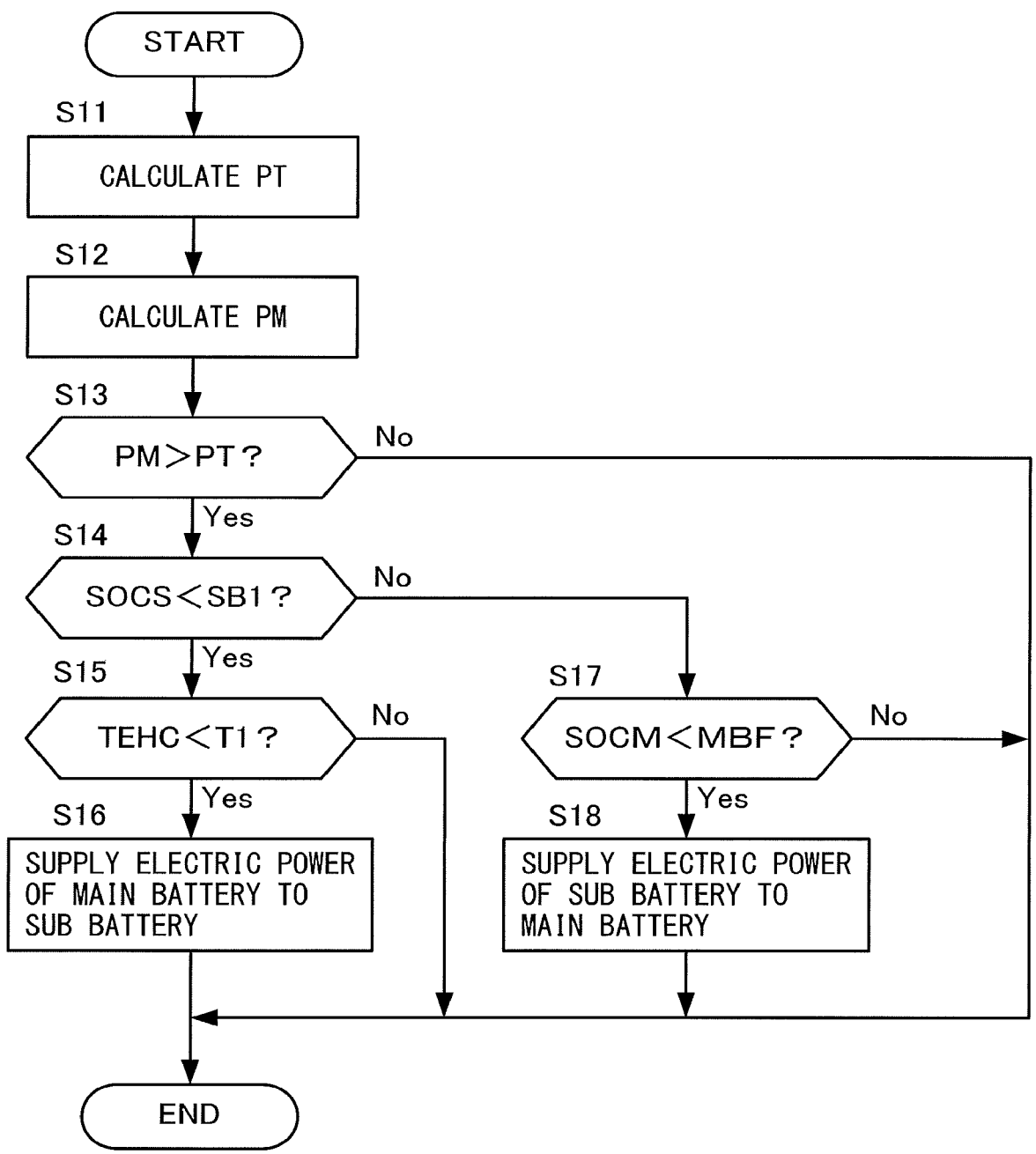
FIG. 3 is a flow chart for explaining control for transfer of electric power between a main battery and a sub battery according to one embodiment of the present disclosure.

FIG. 3 is a flow chart for explaining the control of transfer of electric power between the main battery 50 and the sub battery 60 according to the present embodiment. The electronic control unit 200 repeatedly performs the present routine by a predetermined processing period.

At step S11, the electronic control unit 200 calculates the demanded output electric power PT (total demanded output electric power of electrical equipment) of the vehicle 100. In the present embodiment, the electronic control unit 200 calculates the sum of the demanded output electric power of the second rotary electrical machine 40 calculated based on the amount of accelerator depression and vehicle speed referring to a map prepared by experiments etc. in advance and the demanded output electric power of the electrical equipment for which operation is demanded other than the second rotary electrical machine 40 as the demanded output electric power PT of the vehicle 100.

At step S12, the electronic control unit 200 calculates the electric power PM [kW] which can be output from the main battery 50. In the present embodiment, the electronic control unit 200 refers to a map prepared by experiments etc. in advance and calculates the electric power PM which can be output from the main battery 50 based on the state of charge SOCM of the main battery 50 and the outside air temperature. The electric power PM which can be output from the main battery 50 basically tends to become greater when the state of charge SOCM of the main battery 50 is large compared to when it is small. Further, the electric power PM which can be output from the main battery 50 basically tends to become larger when the outside air temperature is high compared to when it is low.

Note that, the parameters for calculating the electric power PM which can be output from the main battery 50 are not limited to the state of charge SOCM of the main battery 50 and the outside air temperature. In addition to these or instead of these, it is also possible to use other parameters correlated with the electric power PM which can be output from the main battery 50 (for example, the temperature of the main battery 50 etc.). Further, in the present embodiment, the electric power PM which can be output from the main battery 50 is calculated based on the state of charge SOCM of the main battery 50 and the outside air temperature, but it may also be made a fixed value set in advance.

At step S13, the electronic control unit 200 judges if the electric power PM which can be output from the main battery 50 is larger than the demanded output electric power PT of the vehicle 100. The electronic control unit 200 proceeds to the processing of step S14 if the electric power PM which can be output from the main battery 50 is larger than the demanded output electric power PT of the vehicle 100. On the other hand, the electronic control unit 200 ends the current processing if the electric power PM which can be output from the main battery 50 is the demanded output electric power PT of the vehicle 100 or less.

At step S14, the electronic control unit 200 judges if the state of charge SOCS of the sub battery 60 is less than the state of charge SB1 for preparation for startup. The electronic control unit 200 proceeds to the processing of step S15 if the state of charge SOCS of the sub battery 60 is less than the state of charge SB1 for preparation for startup. On the other hand, the electronic control unit 200 proceeds to the processing of step S17 if the state of charge SOCS of the sub battery 60 is the state of charge SB1 for preparation for startup or more.

At step S15, the electronic control unit 200 judges if the catalyst bed temperature TEHC detected by the catalyst temperature sensor 211 is less than a predetermined activation temperature T1. The electronic control unit 200 proceeds to the processing of step S16 if the catalyst bed temperature TEHC is less than the activation temperature T1. On the other hand, the electronic control unit 200 ends the current processing if the catalyst bed temperature TEHC is the activation temperature T1 or more.

At step S16, the electronic control unit 200 supplies the electric power of the main battery 50 to the sub battery 60 to charge the sub battery 60.

Due to this, when the state of charge SOCS of the sub battery 60 is the medium state of charge SBM, rather than relying just on the regenerated power, the state of charge SOCS of the sub battery 60 can be made to quickly increase up to the state of charge SB1 for preparation for startup.

At step S17, the electronic control unit 200 judges if the state of charge SOCM of the main battery 50 is less than the full state of charge MBF. The electronic control unit 200 proceeds to the processing of step S18 if the state of charge SOCM of the main battery 50 is less than the full state of charge MBF. On the other hand, the electronic control unit 200 ends the current processing if the state of charge SOCM of the main battery 50 is the full state of charge MBF.

At step S18, the electronic control unit 200 supplies the electric power of the sub battery 60 to the main battery 50 to charge the main battery 50.

In this way, in the present embodiment, when the state of charge SOCS of the sub battery 60 is the state of charge SB1 for preparation for startup or more, the electric power of the sub battery 60 is supplied to the main battery 50 to charge the main battery 50, but this is due to the following reason.

As explained above, the sub battery 60 is a battery with a higher output density compared with the main battery 50. The amount of electric power able to be charged/discharged per unit time is larger than the main battery 50. For this reason, by preferentially charging the regenerated power of the second rotary electrical machine 40 in the sub battery 60 like in the present embodiment, it is possible to efficiently recover the regenerated power as much as possible without loss. Therefore, to recover the regenerated power of the second rotary electrical machine 40 as much as possible without loss, it is necessary to make the state of charge SOCS of the sub battery 60 smaller than the full state of charge.

Further, regarding the state of charge SOCS of the sub battery 60, if possible to maintain it at least at the state of charge SB1 for preparation for startup, even if the sub electric power demanded state continues for a long period of time, the catalyst device 15 can be made to finish warming up before the state of charge SOCS of the sub battery 60 becomes the low state of charge SBL.

Therefore, in the present embodiment, when the state of charge SOCS of the sub battery 60 is the state of charge SB1 for preparation for startup or more, the electric power of the sub battery 60 is supplied to the main battery 50 to charge the main battery 50.

According to the present embodiment explained above, there is provided an electronic control unit 200 (control device) for controlling a vehicle 100 which is provided with an internal combustion engine 10, a second rotary electrical machine 40 (rotary electrical machine), an electric heating type catalyst device 15 provided in an exhaust passage 14 of the internal combustion engine 10, a main battery 50 (first battery) for supplying electric power to electrical equipment including at least the second rotary electrical machine 40 and the catalyst device 15, and a sub battery 60 (second battery) for supplying the insufficient electric power to electrical equipment if the electric power PM which can be output from the main battery 50 is smaller than the total demanded output electric power of the electrical equipment, that is, the demanded output electric power PT of the vehicle 100, wherein the electronic control unit 200 comprises an electric power supply control part controlling the supply of electric power to the electrical equipment, and an electric power transfer control part controlling the transfer of electric power between the main battery 50 and the sub battery 60.

Further, the electric power supply control part is configured to supply the electric power of the sub battery 60 to the catalyst device 15 if the electric power PM which can be output from the main battery 50 is smaller than the total demanded output electric power of the electrical equipment and a need arises for supplying electric power to the catalyst device 15 for warming up the catalyst device 15. Further, the electric power transfer control part is configured so as to supply the electric power of the main battery 50 to the sub battery 60 if the electric power PM which can be output from the main battery 50 is larger than the total demanded output electric power of the electrical equipment, the state of charge SOCS of the sub battery 60 is less than a predetermined state of charge SB1 for preparation for startup (first state of charge) required when using the electric power of the sub battery 60 to warm up the catalyst device 15, and the temperature TEHC of the catalyst device 15 is less than the activation temperature T1 (predetermined temperature).

Due to this, when the state of charge SOCS of the sub battery 60 becomes less than the state of charge SB1 for preparation for startup, rather than relying on just the regenerated power, it is possible to use the electric power of the main battery 50 to make the state of charge SOCS of the sub battery 60 quickly increase. For this reason, when a need arises for using the electric power of the sub battery 60 to warm up the catalyst device 15, it is possible to keep the state of charge SOCS of the sub battery 60 from becoming insufficient relative to the amount of electric power required for warming up the catalyst device 15.

Further, the electronic control unit 200 according to the present embodiment is further provided with a regenerated power supply control part controlling to where the regenerated power of the second rotary electrical machine 40 (rotary electrical machine) is supplied. Further, the sub battery 60 (second battery) is a battery with a higher output density than the main battery 50 (first battery). The regenerated power supply control part is configured so as to preferentially supply the regenerated power of the second rotary electrical machine 40 to the sub battery 60 when the state of charge SOCS of the sub battery 60 is less than a predetermined maintained target state of charge SBT (second state of charge) larger than the state of charge SB1 for preparation for startup. Further, the electric power transfer control part is configured so as to supply the electric power of the sub battery 60 to the main battery 50 if the state of charge SOCS of the sub battery 60 is the state of charge SB1 for preparation for startup or more and the state of charge SOCM of the main battery 50 is less than the full state of charge MBF.

Due to this, it is possible to recover the regenerated power of the second rotary electrical machine 40 without loss as much as possible. Further the state of charge SOCS of the sub battery 60 is maintained at least at the state of charge SB1 for preparation for startup, so even if the sub electric power demanded state continues for a long period of time, the catalyst device 15 can be made to finish warming up before the state of charge of the sub battery 60 becomes the low state of charge SBL.

Further, the electric power supply control part of the electronic control unit 200 according to the present embodiment is configured so as to supply the electric power of the sub battery 60 to the catalyst device 15 to start the warm-up of the catalyst device 15 if the electric power PM which can be output from the main battery 50 (first battery) is smaller than the total demanded output electric power of the electrical equipment, the state of charge SOCS of the sub battery 60 (second battery) becomes less than the state of charge SB1 for preparation for startup (first state of charge), and the temperature TEHC of the catalyst device 15 is less than the activation temperature T1 (predetermined temperature).

Due to this, even after the state of charge SOCS of the sub battery 60 becomes less than a state of charge SB1 for preparation for startup, the sub electric power demanded state continues. Even when the state of charge SOCS of the sub battery 60 becomes less than the low state of charge SBL and the internal combustion engine 10 must be started, the exhaust emission can be kept from deteriorating.

Above, an embodiment of the present disclosure was explained, but the above embodiment only shows one of the examples of application of the present disclosure and is not meant to limit the technical scope of the present disclosure to the specific constitution of the above embodiment.

The invention claimed is:

1. A control device for controlling a vehicle, the vehicle comprising:
   an internal combustion engine;
   a rotary electrical machine;
   an electric heating type catalyst device provided in an exhaust passage of the internal combustion engine;
   a first battery for supplying electric power to electrical equipment including at least the rotary electrical machine and the catalyst device; and
   a second battery for supplying insufficient electric power to the electrical equipment if electric power which can be output by the first battery is smaller than a total demanded output electric power of the electrical equipment, the control device comprises:
   an electric control unit configured to control a supply of electric power to the electrical equipment, and control transfer of electric power between the first battery and the second battery, wherein
   the electric control unit is configured so to supply the electric power of the second battery to the catalyst device if the electric power which can be output by the first battery is smaller than the total demanded output electric power of the electrical equipment and a need arises for supplying electric power to the catalyst device so as to warm up the catalyst device, and
   the electric power control unit is configured to supply the electric power of the first battery to the second battery if the electric power which can be output by the first battery is larger than the total demanded output electric power of the electrical equipment, the state of charge of the second battery is less than a predetermined first state of charge which is required when using the electric power of the second battery to warm up the catalyst device, and the temperature of the catalyst device is less than a predetermined temperature.

2. The control device according to claim 1, wherein
   the electronic control unit is configured to control to where regenerated power of the rotary electrical machine is supplied,
   the second battery is a battery with a higher output density than the first battery,
   the electronic control unit is configured to preferentially supply the regenerated power of the rotary electrical machine to the second battery when the state of charge of the second battery is less than a predetermined second state of charge larger than the first state of charge, and
   the electronic control unit is configured to supply the electric power of the second battery to the first battery if the state of charge of the second battery is the first state of charge or more and the state of charge of the first battery is less than the full state of charge.

3. The control device according to claim 1, wherein
   the electronic control unit is configured to supply the electric power of the second battery to the catalyst device to start the warm-up of the catalyst device if electric power which can be output by the first battery is smaller than the total demanded output electric power of the electrical equipment, the state of charge of the second battery becomes less than the first state of charge, and the temperature of the catalyst device is less than a predetermined temperature.

\* \* \* \* \*